US011458631B2

(12) United States Patent
Shikano et al.

(10) Patent No.: US 11,458,631 B2
(45) Date of Patent: Oct. 4, 2022

(54) VEHICLE TRANSPORT APPARATUS

(71) Applicant: HONDA MOTOR CO., LTD., Tokyo (JP)

(72) Inventors: Naoto Shikano, Wako (JP); Tomoki Murozono, Wako (JP); Shuhei Kondo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 16/801,988

(22) Filed: Feb. 26, 2020

(65) Prior Publication Data

US 2020/0269427 A1 Aug. 27, 2020

(30) Foreign Application Priority Data

Feb. 27, 2019 (JP) .............................. JP2019-034655

(51) Int. Cl.
| | | |
|---|---|---|
| B25J 9/16 | (2006.01) | |
| B25J 5/00 | (2006.01) | |
| B25J 19/02 | (2006.01) | |
| B25J 13/08 | (2006.01) | |
| B25J 3/04 | (2006.01) | |

(52) U.S. Cl.
CPC .............. B25J 9/1679 (2013.01); B25J 3/04 (2013.01); B25J 5/007 (2013.01); B25J 9/1694 (2013.01); B25J 13/086 (2013.01); B25J 19/02 (2013.01)

(58) Field of Classification Search
USPC ................................................. 700/245–264
See application file for complete search history.

(56) References Cited

U.S. PATENT DOCUMENTS

| | | | | |
|---|---|---|---|---|
| 9,607,285 | B1* | 3/2017 | Wellman | G05D 1/0027 |
| 9,816,283 | B2* | 11/2017 | Nordbruch | G05D 1/0297 |
| 10,023,095 | B2* | 7/2018 | Temple | B60P 3/125 |
| 10,160,468 | B1* | 12/2018 | Hurd | B62B 5/0093 |
| 10,744,922 | B2* | 8/2020 | Idelevitch | E04H 6/36 |
| 11,155,247 | B1* | 10/2021 | Ebrahimi Afrouzi | B62D 33/0636 |

(Continued)

FOREIGN PATENT DOCUMENTS

| | | |
|---|---|---|
| CN | 202970049 U | 6/2013 |
| CN | 205100621 U | 3/2016 |

(Continued)

OTHER PUBLICATIONS

Office Action including search report dated Mar. 3, 2021 issued over the corresponding Chinese Patent Application No. 202010124715.3 with the English translation thereof.

(Continued)

*Primary Examiner* — Jonathan L Sample
(74) *Attorney, Agent, or Firm* — Carrier Blackman & Associates P.C.; William D. Blackman; Joseph P. Carrier

(57) ABSTRACT

A vehicle transport apparatus is formed by a first robot and a second robot that enter underneath a vehicle, lift up wheels of the vehicle, and travel. The first robot and the second robot each include a distance sensor that detects a distance between the corresponding robot and an object near the corresponding robot, and a robot computing section that controls a travel operation and a loading operation of the corresponding robot. When the vehicle is to be lowered in a parking region, the robot computing section adjusts a parking position of the vehicle based on information detected by the distance sensor.

8 Claims, 11 Drawing Sheets

(56) References Cited

U.S. PATENT DOCUMENTS

| | | | |
|---|---|---|---|
| 2008/0145196 A1* | 6/2008 | Liu | E04H 6/245 414/242 |
| 2010/0161128 A1* | 6/2010 | Choi | E04H 6/422 901/1 |
| 2010/0219610 A1* | 9/2010 | Shapery | B61J 3/12 280/476.1 |
| 2011/0170994 A1* | 7/2011 | Coombs | B60P 3/125 414/427 |
| 2014/0100690 A1* | 4/2014 | Wurman | G06Q 10/087 700/230 |
| 2014/0255137 A1* | 9/2014 | Haertel | B64D 9/00 414/529 |
| 2018/0039282 A1* | 2/2018 | Gupta | G06Q 10/0833 |
| 2018/0135328 A1* | 5/2018 | Wu | E04H 6/34 |
| 2019/0064845 A1* | 2/2019 | Pardasani | G05B 19/41895 |
| 2019/0177138 A1* | 6/2019 | Matamoros | E04H 6/34 |
| 2019/0218810 A1* | 7/2019 | Zhang | G05D 1/0088 |
| 2020/0180696 A1* | 6/2020 | Tzivanopoulos | E04H 6/34 |
| 2020/0183421 A1* | 6/2020 | Schütz | G05D 1/0088 |
| 2020/0269425 A1* | 8/2020 | Shikano | B25J 3/04 |
| 2020/0269426 A1* | 8/2020 | Shikano | B25J 9/1664 |

FOREIGN PATENT DOCUMENTS

| | | |
|---|---|---|
| CN | 205637766 U | 10/2016 |
| CN | 107878420 A | 4/2018 |
| CN | 108678468 A | 10/2018 |
| CN | 109083472 A | 12/2018 |
| JP | H09-078875 A | 3/1997 |
| JP | 2009-286570 A | 12/2009 |
| JP | 2010-150861 A | 7/2010 |
| JP | 2016-216936 A | 12/2016 |
| JP | 2017-053082 A | 3/2017 |
| JP | 2017-095926 A | 6/2017 |
| JP | 2018-203468 A | 12/2018 |

OTHER PUBLICATIONS

Office Action dated Mar. 1, 2022 issued over the corresponding Japanese Patent Application No. 2019-034655 and the English translation thereof.

Office Action including search report dated Dec. 27, 2021 issued over the corresponding Chinese Patent Application No. 202010124715.3 with the English translation thereof.

Office Action (Decision of Refusal) dated Jul. 19, 2022 issued over the corresponding Japanese Patent Application No. 2019-034655 with the English translation thereof.

Office Action dated May 18, 2022 issued over the corresponding Chinese Patent Application No. 202010124715.3 with the English translation thereof.

* cited by examiner

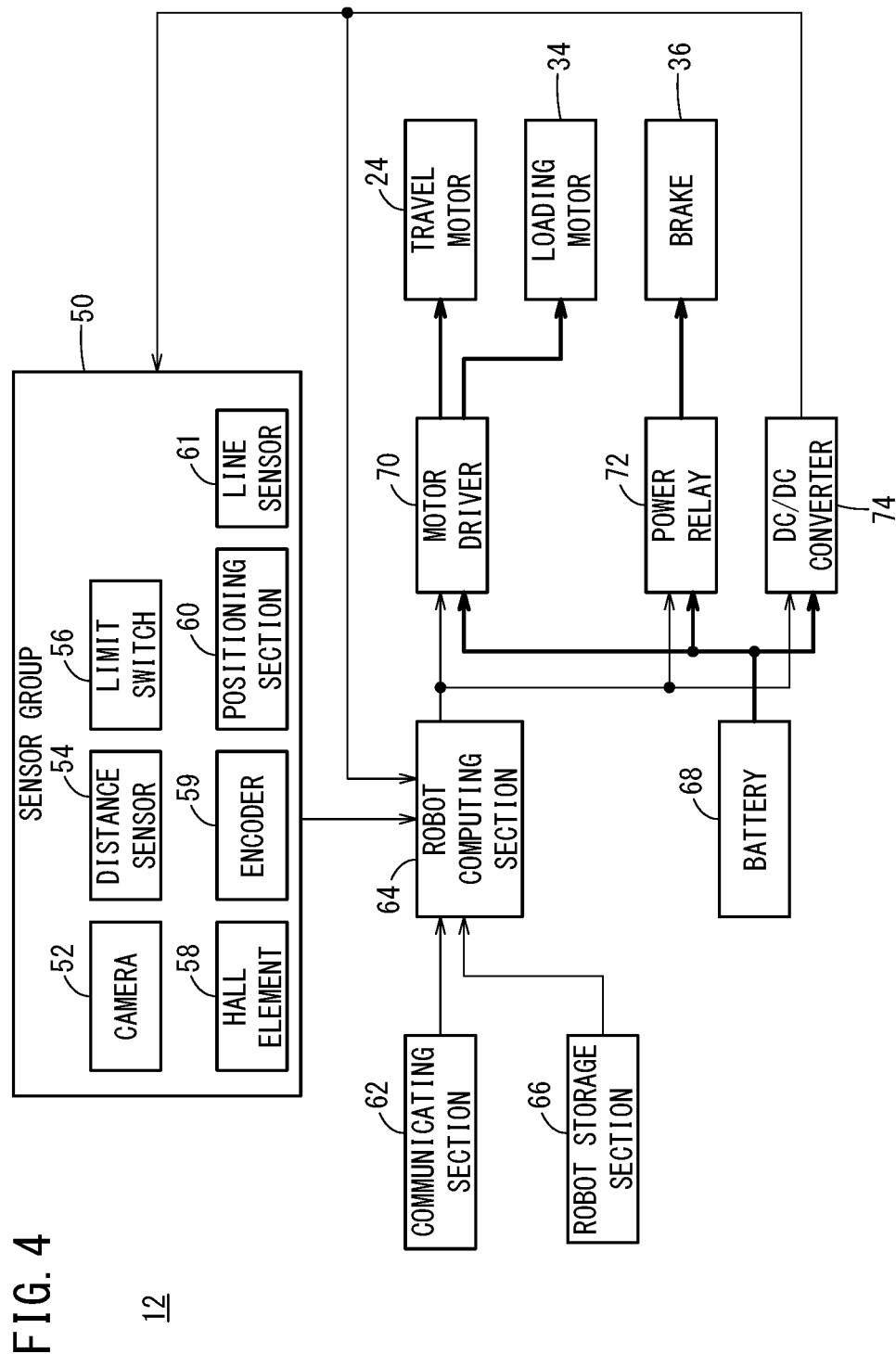

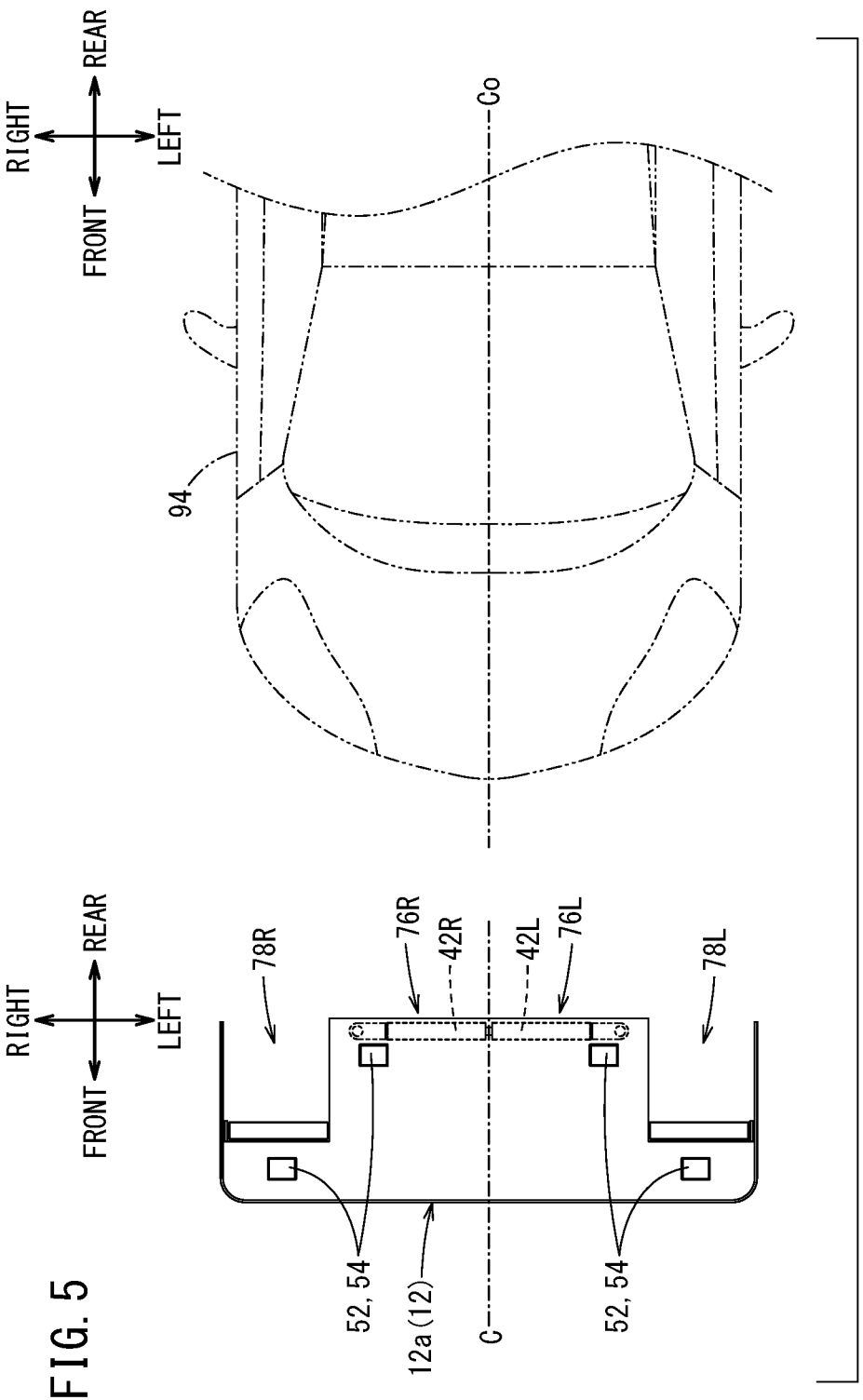

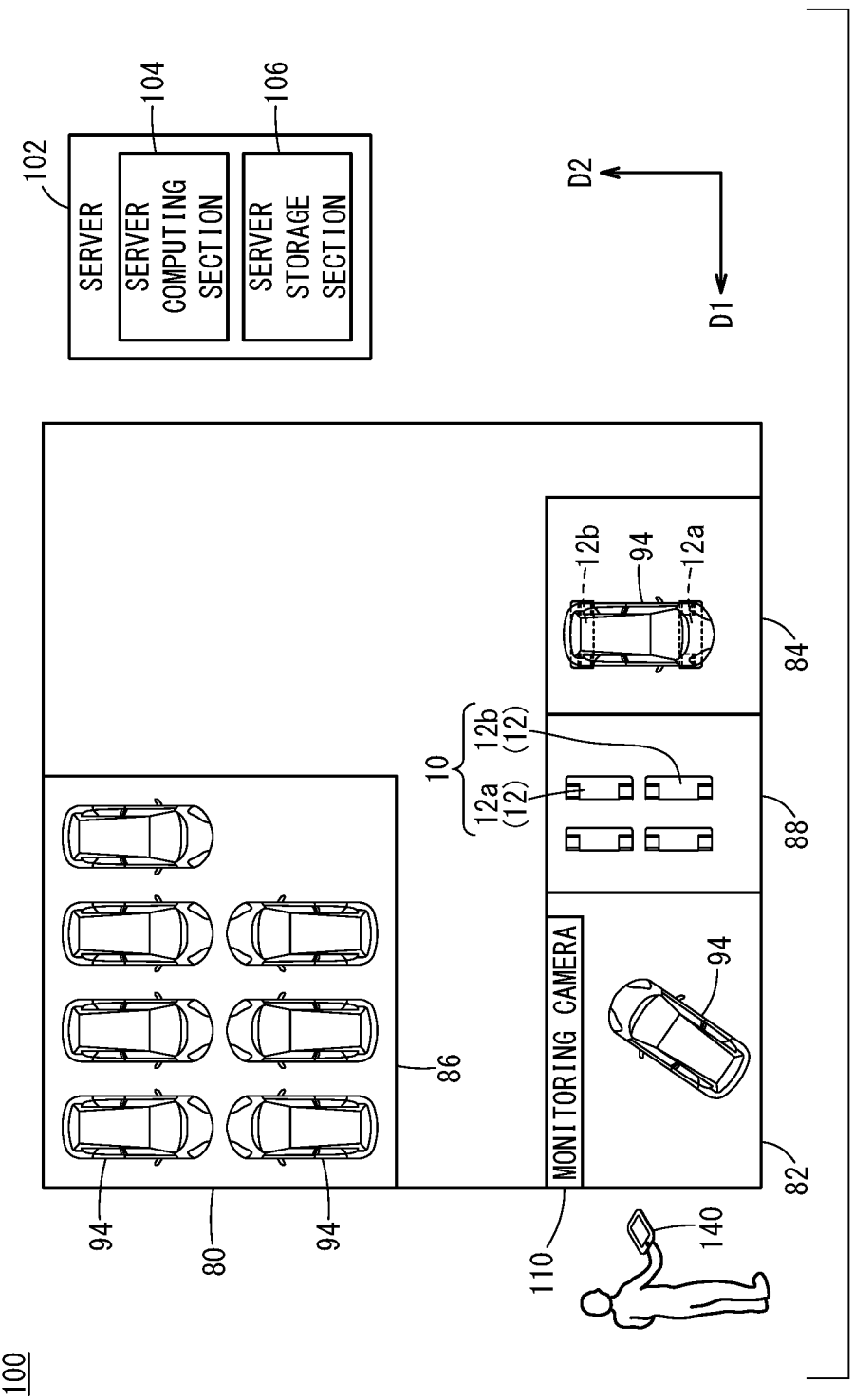

| POSITION INFORMATION | IDENTIFICATION INFORMATION |
|---|---|
| ⋮ | ⋮ |

122  124

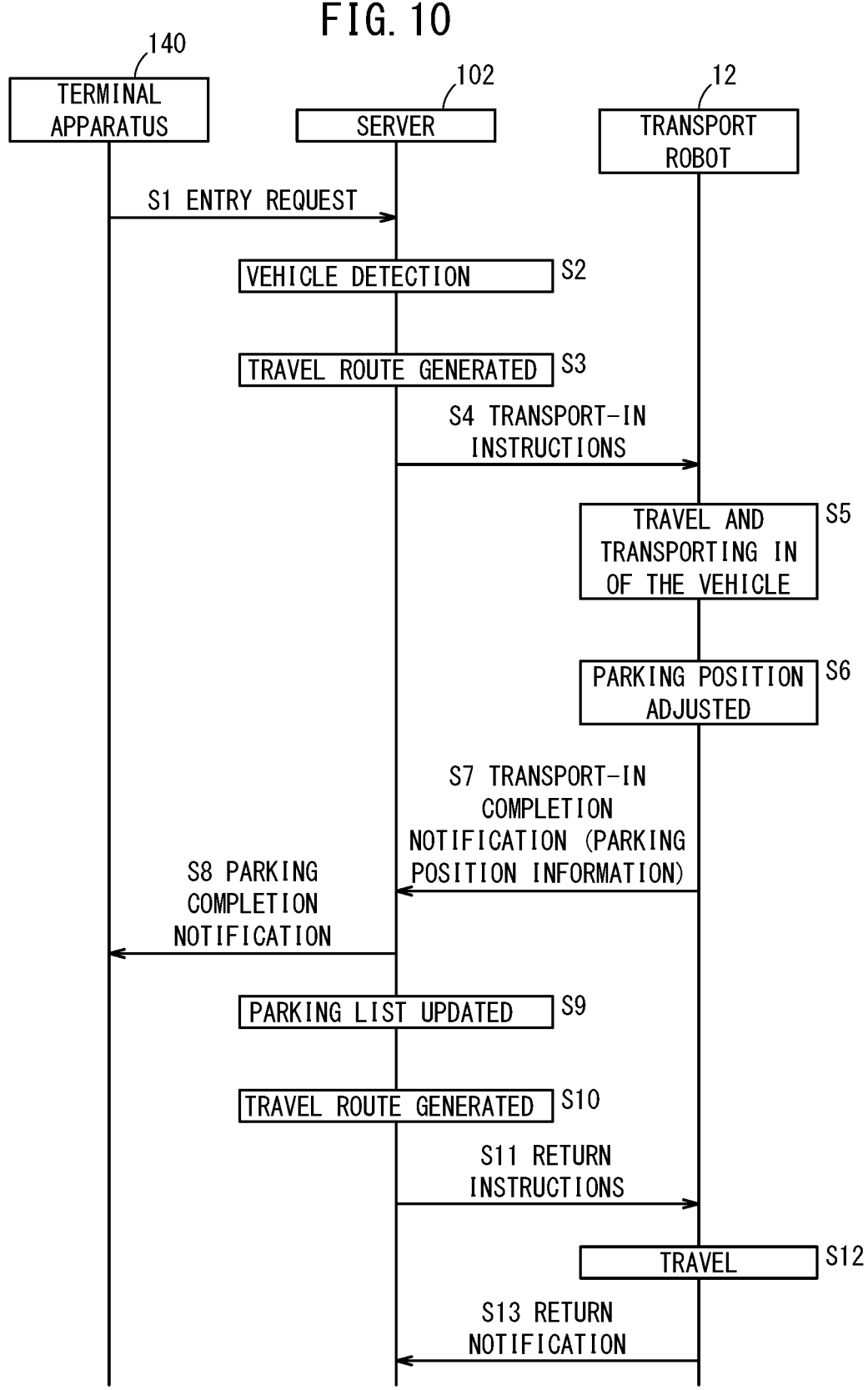

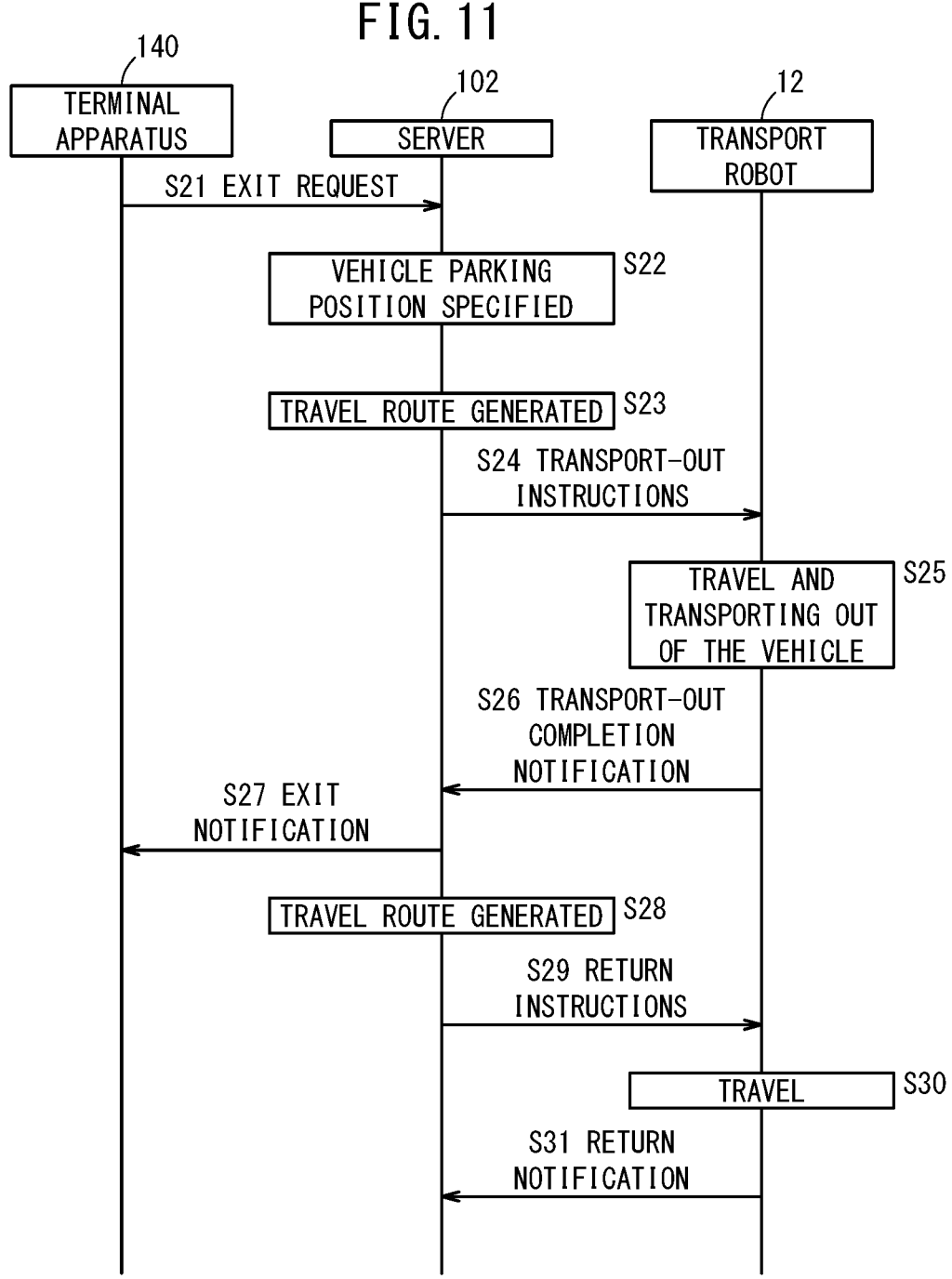

VEHICLE TRANSPORT APPARATUS

CROSS-REFERENCE TO RELATED APPLICATION

This application is based upon and claims the benefit of priority from Japanese Patent Application No. 2019-034655 filed on Feb. 27, 2019, the contents of which are incorporated herein by reference.

BACKGROUND OF THE INVENTION

Field of the Invention

The present invention relates to a vehicle transport apparatus for transporting a vehicle within a parking region.

Description of the Related Art

Japanese Laid-Open Patent Publication No. 09-078875 discloses a parking apparatus that effectively utilizes a limited space and improves parking efficiency.

SUMMARY OF THE INVENTION

In a parking region (parking lot, cargo ship, harbor, or the like) that is not provided with a parking apparatus such as described in Japanese Laid-Open Patent Publication No. 09-078875, there is a desire to effectively utilize the spaces.

The present invention takes the above problems into consideration, and it is an object of the present invention to provide a vehicle transport apparatus that makes it possible to effectively utilize the space of a parking region.

The present invention is a vehicle transport apparatus configured to transport a vehicle by lifting up wheels of the vehicle, including a first robot configured to enter underneath the vehicle, lift up front wheels of the vehicle, and travel; and a second robot configured to enter underneath the vehicle, lift up rear wheels of the vehicle, and travel, wherein the first robot and the second robot each include omnidirectional wheels configured to cause a body to freely travel and turn omnidirectionally; a drive force transmitting mechanism configured to transmit a drive force to the omnidirectional wheels; a distance sensor configured to detect a distance between a corresponding robot of the first and second robots and an object near the corresponding robot; and a robot computing section configured to control a travel operation and a loading operation of the corresponding robot, wherein when the vehicle is to be lowered in a parking region, the robot computing section adjusts a parking position of the vehicle based on information detected by the distance sensor.

According to the present invention, it is possible to effectively utilize the space of a parking lot.

The above and other objects features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 shows a block configuration of a control system and a power system of the transport robot;

FIG. 5 is a schematic view of the vehicle transport apparatus at a stage of aligning with the vehicle;

FIG. 8 shows a system configuration of a vehicle transport system;

FIG. 9 is a schematic view of a parking list;

FIG. 10 is a sequence diagram showing an entry process in which the vehicle enters a parking lot; and FIG. 11 is a sequence diagram showing an exit process in which the vehicle exits the parking lot.

DESCRIPTION OF THE PREFERRED EMBODIMENTS

The following describes in detail preferred embodiments of a vehicle transport apparatus according to the present invention, while referencing the accompanying drawings.

[1. Vehicle Transport Apparatus 10]

Figure 1A:
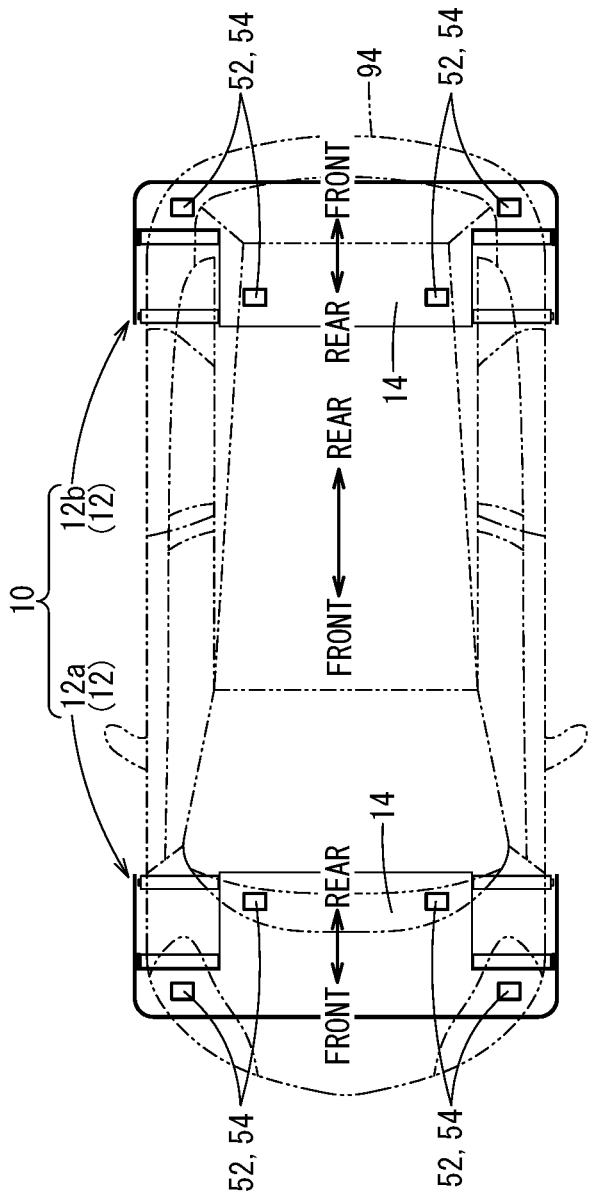
FIGS. 1A and 1B are each a schematic view of a vehicle transport apparatus that transports a vehicle.
Figure 1B:
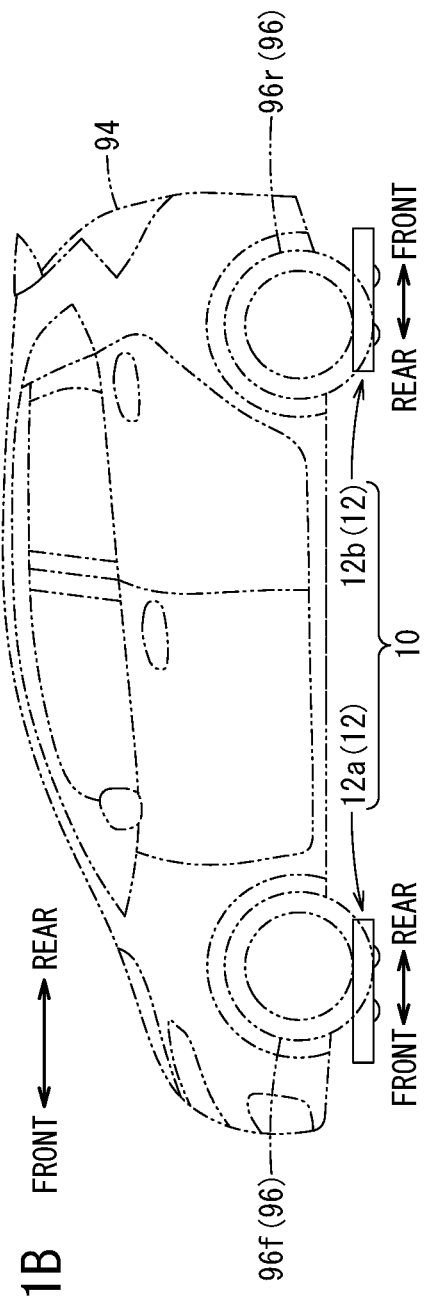

As shown in FIGS. 1A and 1B, the vehicle transport apparatus 10 includes a set of transport robots 12 (first robot 12a and second robot 12b) that can travel autonomously within a prescribed region where transport of a vehicle 94 is required. The first robot 12a can enter underneath the vehicle 94, lift up front wheels 96f of the vehicle 94, and move autonomously within the prescribed region. The second robot 12b can enter underneath the vehicle 94, lift up rear wheels 96r of the vehicle 94, and travel autonomously within the prescribed region. The first robot 12a and the second robot 12b have the same structure. However, the first robot 12a is a master device, and the second robot 12b is a slave device.

[1.1. Structure of the Transport Robots 12]

Figure 2:
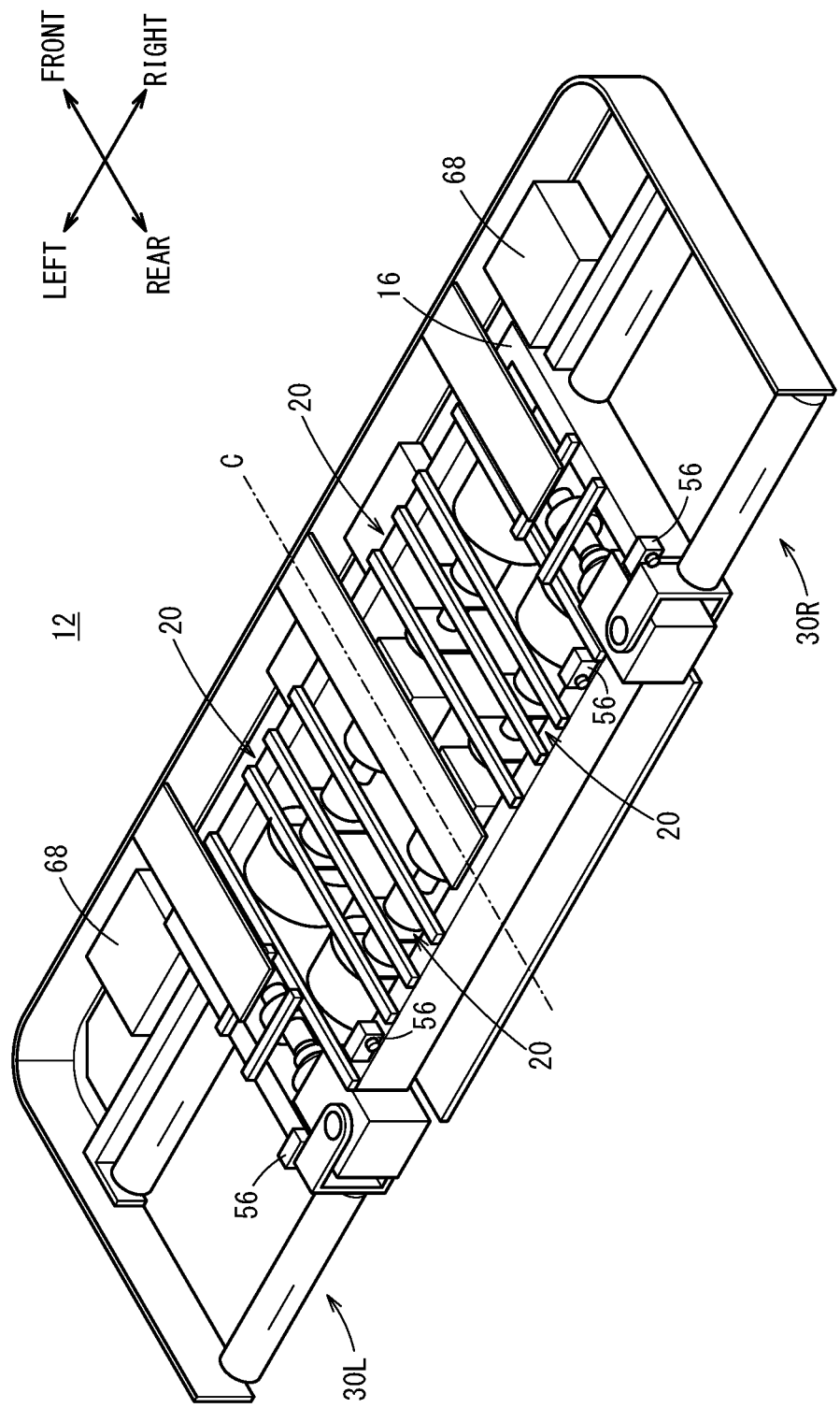
FIG. 2 is a perspective view of a transport robot with the upper cover removed.
Figure 3:
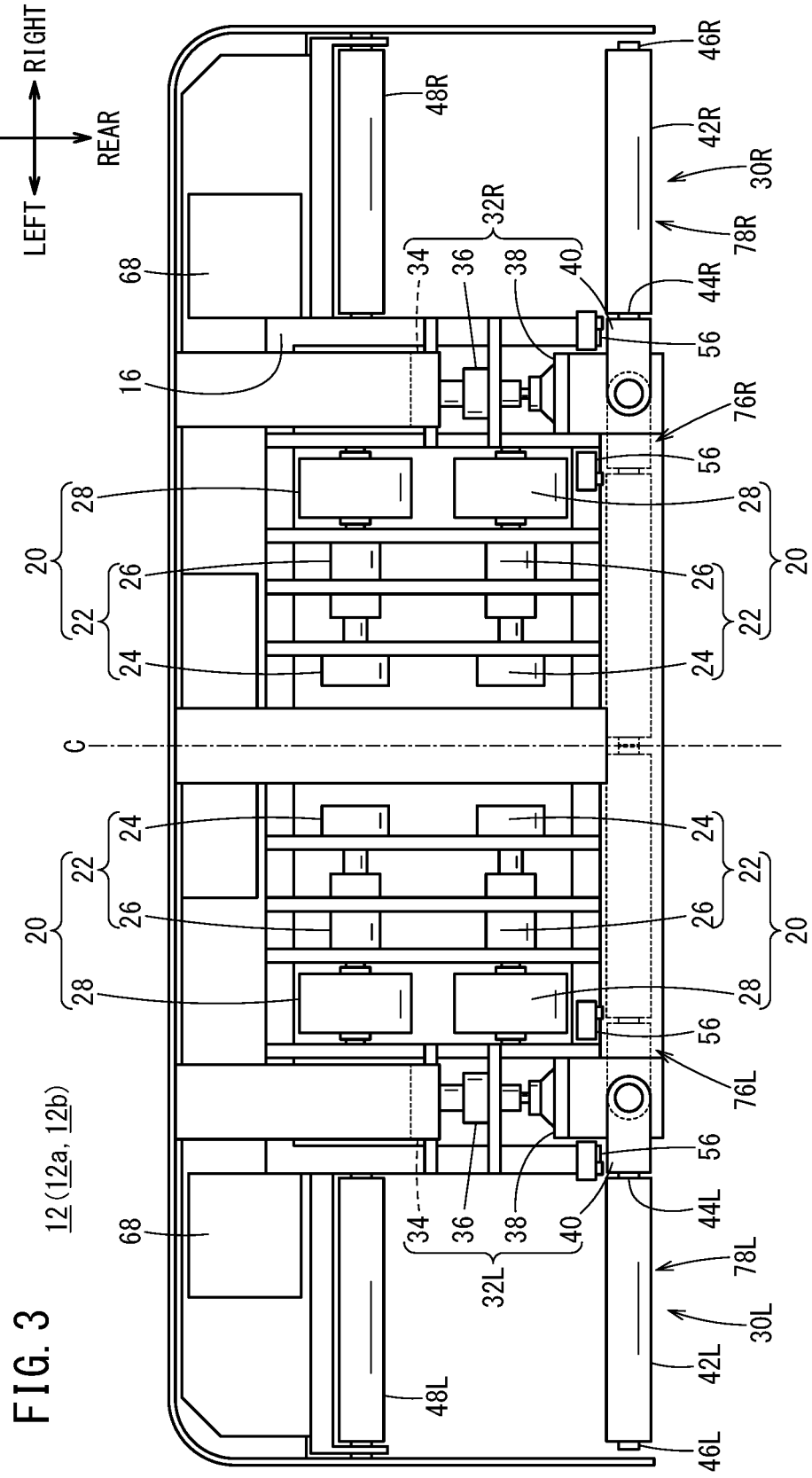
FIG. 3 is a top view of the transport robot with the upper cover removed.

The following describes the structure of a transport robot 12 (first robot 12a or second robot 12b), using FIGS. 2 and 3. FIGS. 2 and 3 show the transport robot 12 in a state where an upper cover 14 (see FIG. 1A) that covers the top portion of the body 16 is removed. In this specification, in order to aid the description, each direction used as a reference for the transport robot 12 is defined as shown below. A direction in which a right contact portion 48R and a left contact portion 48L are arranged relative to a right lifting arm 42R and a left lifting arm 42L, which are described further below, is a forward direction, and the opposite of this direction is a backward direction. Furthermore, in this specification, a direction in which a right load-bearing mechanism 30R, which is described further below, is arranged relative to a center position (referred to below as the center line C) in a width direction of the transport robot 12 is the right direction, and the direction in which a left load-bearing mechanism 30L, which is described further below, is arranged relative to the center line C is the left direction. In the following description, unless otherwise specified, forward, backward, right, and left refer to the forward, backward, right, and left directions of the transport robot 12.

The transport robot 12 basically includes the body 16, four sets of drive mechanisms 20 arranged inside the body 16, the right load-bearing mechanism 30R arranged on the right side of the body 16, and the left load-bearing mechanism 30L arranged on the left side of the body 16. The right load-bearing mechanism 30R is arranged on the right side of the transport robot 12. The left load-bearing mechanism 30L is arranged on the left side of the transport robot 12. The four sets of drive mechanisms 20 are arranged in the center of the transport robot 12 between the right load-bearing mechanism 30R and the left load-bearing mechanism 30L. The body 16 is a frame that forms the transport robot 12 and supports each component.

The first set of drive mechanisms 20 includes a drive force transmitting mechanism 22 and an omnidirectional wheel 28. The drive force transmitting mechanism 22 includes a travel motor 24 and a drive-side reduction gear (speed reducer) 26. The four sets of drive mechanisms 20 are separated into two groups, which are arranged respectively on the left and right of the center line C. The two sets of drive mechanisms 20 on the left side and the two sets of drive mechanisms 20 on the right side are arranged to be linearly symmetric, with the center line C as the axis. Furthermore, the two sets of drive mechanisms 20 on the front side and the two sets of drive mechanisms 20 on the rear side are arranged to be linearly symmetric, with a line (not shown in the drawings) parallel to the width direction of the transport robot 12 as the axis. The travel motor 24, the drive-side reduction gear 26, and the omnidirectional wheel 28 in each set are arranged in the stated order from the center line C toward the outside in the width direction. Furthermore, the travel motor 24, the drive-side reduction gear 26, and the omnidirectional wheel 28 in each set are arranged such that the axes thereof coincide with each other.

The travel motor 24 is an electric motor. An output shaft of the travel motor 24 is connected to an input shaft of the drive-side reduction gear 26. The drive-side reduction gear 26 includes the input shaft and an output shaft on the same line, and includes a planetary gear reducer, for example. The output shaft of the drive-side reduction gear 26 is connected to the omnidirectional wheel 28.

The omnidirectional wheel 28 is a Mecanum wheel. The Mecanum wheel provided to each set can move the body 16 omnidirectionally (in a holonomic manner with 2 degrees of freedom in a plane) by operating in cooperation with each other to drive the body 16. Each drive mechanism 20 in the present embodiment includes a Mecanum wheel, but may instead include another type of wheel capable of omnidirectional driving. For example, each drive mechanism 20 may include an Omni wheel instead of the Mecanum wheel. Since the body 16 can travel omnidirectionally and turn freely if three Omni wheels are included, it is only necessary to provide three sets of drive mechanisms 20. The transport robot 12 may include an auxiliary wheel along with the omnidirectional wheels 28, in order to stabilize the orientation in the horizontal direction.

The right load-bearing mechanism 30R includes the right rotational force transmitting mechanism 32R, the right lifting arm 42R, and the right contact portion 48R. The left load-bearing mechanism 30L includes the left rotational force transmitting mechanism 32L, the left lifting arm 42L, and the left contact portion 48L. The right load-bearing mechanism 30R and the left load-bearing mechanism 30L are arranged to be linearly symmetrical, with the center line C as the axis. The right rotational force transmitting mechanism 32R and the left rotational force transmitting mechanism 32L each include a loading motor 34, a brake 36, a loading-side speed reducer 38, and a link member 40. The loading motor 34, the brake 36, the loading-side speed reducer 38, and the link member 40 are arranged in the stated order in a direction toward the rear of the transport robot 12. The link member 40 is arranged at the rear end of the transport robot 12. Since the right load-bearing mechanism 30R and the left load-bearing mechanism 30L have the same structure, the following describes only the right load-bearing mechanism 30R. The description of the right load-bearing mechanism 30R can also be applied to the left load-bearing mechanism 30L, by switching the term "right" for "left" and switching "R" for "L" in the reference numerals.

The loading motor 34 is an electric motor. The output shaft of the loading motor 34 is connected to the input shaft of the brake 36. The brake 36 is an electromagnetic brake, for example. The output shaft of the brake 36 is connected to the input shaft of the loading-side speed reducer 38. The loading-side speed reducer 38 has the input shaft and the output shaft that are orthogonal to each other, and it is a bevel gear, for example. The output shaft of the loading-side speed reducer 38 is connected to the link member 40. This output shaft is parallel to the up-down direction. The link member 40 includes a top plate part and a bottom plate part that are parallel to the front-rear direction and the width direction, and a side plate part that is connected to an end portion of the top plate part and an end portion of the bottom plate part and is parallel to the up-down direction. The top plate part is connected to the output shaft of the loading-side speed reducer 38, and the bottom plate part is connected to the body 16 in a rotatable manner.

The right lifting arm 42R is a rotating rod that includes a shaft member that is parallel to the front-rear direction and the width direction and a cylindrical member that is concentric with the shaft member and rotatable centered on the shaft member. A base portion 44R of the shaft member of the right lifting arm 42R is connected to the side plate part of the link member 40. The right lifting arm 42R moves rotationally between a right storage position 76R where a tip 46R points at the center of the body 16 in the width direction and a right expanded position 78R where the tip 46R points at the outside of the body 16 in the width direction (the right direction), in accordance with the rotational operation of the link member 40.

The right storage position 76R and the right expanded position 78R are positions where the shaft member of the right lifting arm 42R is parallel to the width direction. In other words, the right storage position 76R is the position of the right lifting arm 42R after the right lifting arm 42R has been rotated 180 degrees from the right expanded position 78R in a plane parallel to the front-rear direction and the width direction. On the other hand, the right expanded position 78R is the position of the right lifting arm 42R after the right lifting arm 42R has been rotated 180 degrees from the right storage position 76R in the plane parallel to the front-rear direction and the width direction.

The right contact portion 48R is a rotating rod that includes a shaft member extending from the body 16 toward the outside in the width direction and a cylindrical member that is concentric with the shaft member and rotatable centered on the shaft member. Both ends of the shaft member of the right contact portion 48R are fixed to the body 16. The shaft member is arranged on an extension line of the axes of the two sets of drive mechanisms 20 on the front side.

The transport robot 12 can enter underneath the vehicle 94, lift up the vehicle 94, and travel underneath the vehicle 94. Therefore, the total height of the transport robot 12 is preferably as low as possible. The total height of the transport robot 12 is preferably less than 150 mm, more preferably less than 140 mm, and even more preferably less than 130 mm. According to safety regulations in Japan, the lower limit for the height of the vehicle 94 from the ground is determined to be 90 mm, and therefore the total height of the transport robot 12 is most preferably less than 90 mm.

[1.2. Configuration of the Control System and Power System of the Transport Robots 12]

The following describes the configuration of the control system and power system of a transport robot 12, using FIG. 4. A portion of the configuration shown in FIG. 4 is also shown in FIGS. 1A and 3. The transport robot 12 includes, as the control system, a sensor group 50, a communicating section 62, a robot computing section 64, a robot storage section 66, a motor driver 70, a power relay 72, and a DC/DC converter 74. The sensor group 50 includes a camera 52, a distance sensor (ranging sensor) 54, a limit switch 56, a Hall element 58, an encoder 59, a positioning section 60, and a line sensor 61.

The camera 52 captures an image of the surroundings of the transport robot 12. The distance sensor 54 is a PSD sensor, radar, LiDAR, LRF, TOF sensor, or the like, for example, and detects the distance to an object in the vicinity of the transport robot 12. A plurality of the cameras 52 and a plurality of the distance sensors 54 are provided, in order to detect targets in all directions of the transport robot 12. As shown in FIG. 1A, in the present embodiment, four sets of a camera 52 and a distance sensor 54 are attached to the upper cover 14. The attachment positions are a front right portion, a front left portion, a rear right portion, and a rear left portion of the upper cover 14. The number, arrangement, and orientation of the cameras 52 are suitably set according to the range in which the cameras 52 are capable of capturing images. Similarly, the number, arrangement, and orientation of the distance sensors 54 are suitably set according to the range in which the distance sensors 54 are to be capable of detection.

The limit switch 56 limits the movement range of the right lifting arm 42R and the left lifting arm 42L. One limit switch 56 is provided at each of a position in front of the right expanded position 78R, a position in front of the right storage position 76R, a position in front of a left expanded position 78L, and a position in front of a left storage position 76L. The Hall element 58 detects rotation speeds of the four travel motors 24 and the two loading motors 34. The Hall element 58 is provided to each motor. The encoder 59 detects the rotational angle of the omnidirectional wheel 28. The encoder 59 is provided on the shaft of the omnidirectional wheel 28. The positioning section 60 includes a GNSS module, an acceleration sensor, a gyro sensor, and the like, for example, and detects the position and orientation of the transport robot 12 using at least one of satellite navigation and inertial navigation. The line sensor 61 captures an image of the ground surfaces (floor surface) on which the transport robot 12 travels.

The communicating section 62 includes a communication apparatus and an antenna for performing wireless communication with an external communication device. The external communication device is a server 102 (see FIG. 8) described further below, for example, and is a communicating section 62 of another transport robot 12 forming a pair with the transport robot 12. The communicating section 62 includes a communication module that performs wireless communication, via a public network, with a communication module for performing close-range wireless communication or Near-Field Communication.

The robot computing section 64 is formed by a processor that includes a CPU, an MPU, and the like, for example. The robot computing section 64 realizes various functions by executing programs stored in the robot storage section 66. The robot storage section 66 is formed by a RAM, a ROM, and the like, for example. The robot storage section 66 stores various programs, various types of information used in the processes performed by the robot computing section 64, and map information of the region in which the transport robot 12 travels.

A motor driver 70 is provided individually for each of the four travel motors 24 and the two loading motors 34. The input side of each motor driver 70 is connected to the battery 68, and the output side of each motor driver 70 is connected to the corresponding travel motor 24 or loading motor 34. The motor driver 70 performs a transformation operation according to a control signal output from the robot computing section 64. The battery 68 is connected to the input side of the power relay 72, and the brake 36 is connected to the output side of the power relay 72. The power relay 72 switches between supplying and cutting off the power from the battery 68, according to an ON signal or an OFF signal output from the robot computing section 64. The input side of the DC/DC converter 74 is connected to the battery 68, and the output side of the DC/DC converter 74 is connected to each electronic device. The DC/DC converter 74 has the power from the battery 68 input thereto, drops this power to a certain voltage, and supplies the resulting power to the sensor group 50 and the robot computing section 64.

[1.3. Loading Operation of the Transport Robot 12]

Here, a description is provided of the loading operation of the first robot 12a that lifts up front wheels 96f, of the two robots that are the transport robots 12. Before lifting up a vehicle 94, the right lifting arm 42R is stored at the right storage position 76R and the left lifting arm 42L is stored at the left storage position 76L.

As shown in FIG. 5, the robot computing section 64 recognizes the orientation of the vehicle 94 to be transported based on the image information captured by the camera 52 and the information detected by the distance sensor 54, moves the first robot 12a to a position in front of the vehicle 94, and causes the rear portion of the first robot 12a to face the front portion of the vehicle 94. At this time, the robot computing section 64 may receive the image information from cameras (external cameras) that are not the cameras of the robot, to recognize the orientation of the vehicle 94 to be transported based on this image information. Furthermore, the robot computing section 64 recognizes the width of the vehicle 94 (vehicle width) and also recognizes the center position (center line Co) in the vehicle width direction, based on the image information. In order to align the center position (center line C) of the first robot 12a in the width direction with the center position (center line Co) of the vehicle 94, the robot computing section 64 outputs a control signal to the motor driver 70 to drive each travel motor 24. At this time, each travel motor 24 operates cooperatively to move the first robot 12a in the width direction (either right or left). After the positional alignment, the robot computing section 64 outputs a control signal to the motor driver 70 to drive each travel motor 24, in order to cause the first robot 12a to move backward. At this time, each travel motor 24 operates cooperatively to move the first robot 12a backward so that the first robot 12a enters underneath the vehicle 94.

Figure 6A:
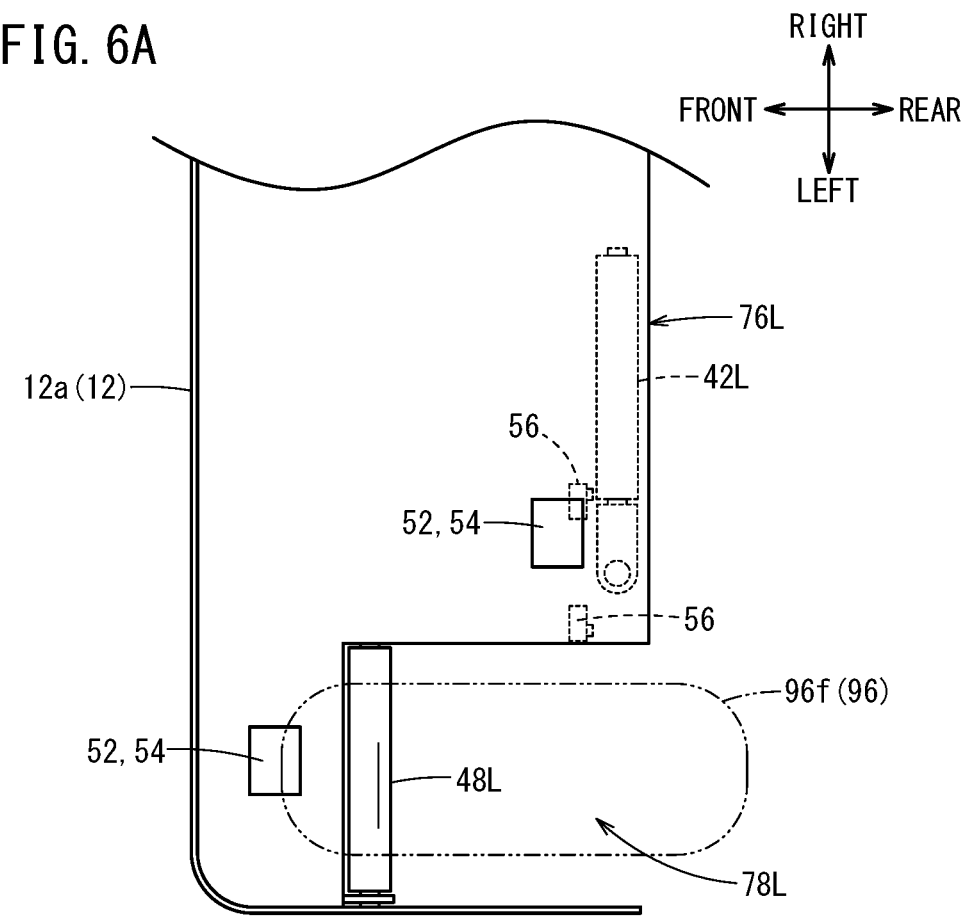
FIGS. 6A and 6B are each a schematic view of the vehicle transport apparatus before lifting up the wheels.
Figure 6B:
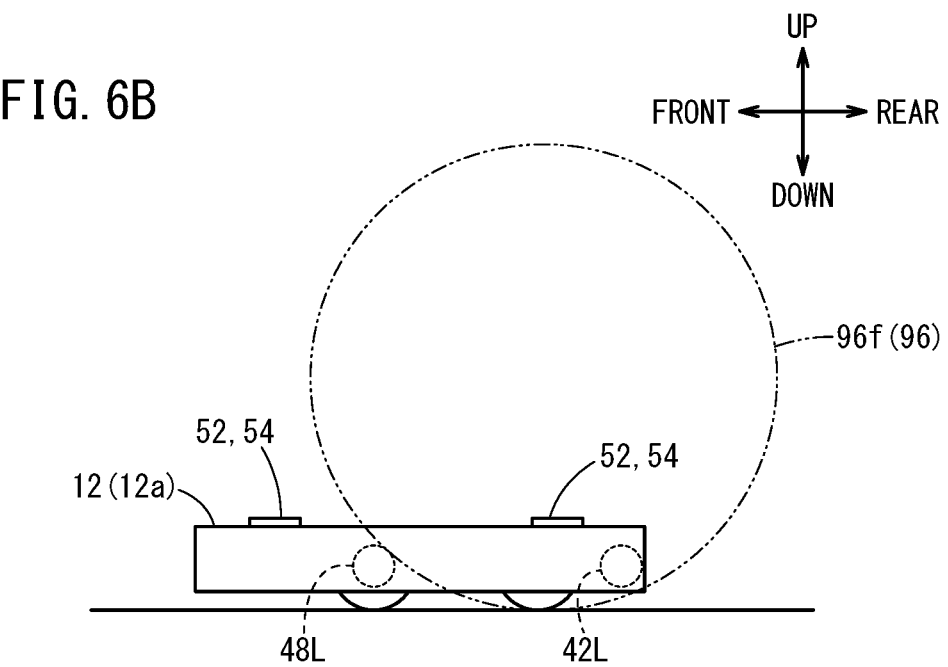

As shown in FIGS. 6A and 6B, when each of the right contact portion 48R and the left contact portion 48L contacts or comes close to (within several centimeters) the contact surface on the front side of each of the left and right front wheels 96f, the robot computing section 64 outputs a control signal to the motor driver 70 to stop each travel motor 24. The robot computing section 64 recognizes that the right contact portion 48R and the left contact portion 48L have contacted or become close to the front wheels 96f based on at least one of the image information captured by the camera 52 and the information detected by the distance sensor 54. Alternatively, the robot computing section 64 also can recognize that the right contact portion 48R and the left contact portion 48L have contacted the front wheels 96f, based on the loads of the travel motors 24 (load >prescribed value). Yet further, before moving the first robot 12a backward, the robot computing section 64 may calculate the distance between the right and left contact portions 48R, 48L and the front wheels 96f based on the information detected by the distance sensor 54, and cause the first robot 12a to move backward by this distance.

Figure 7A:
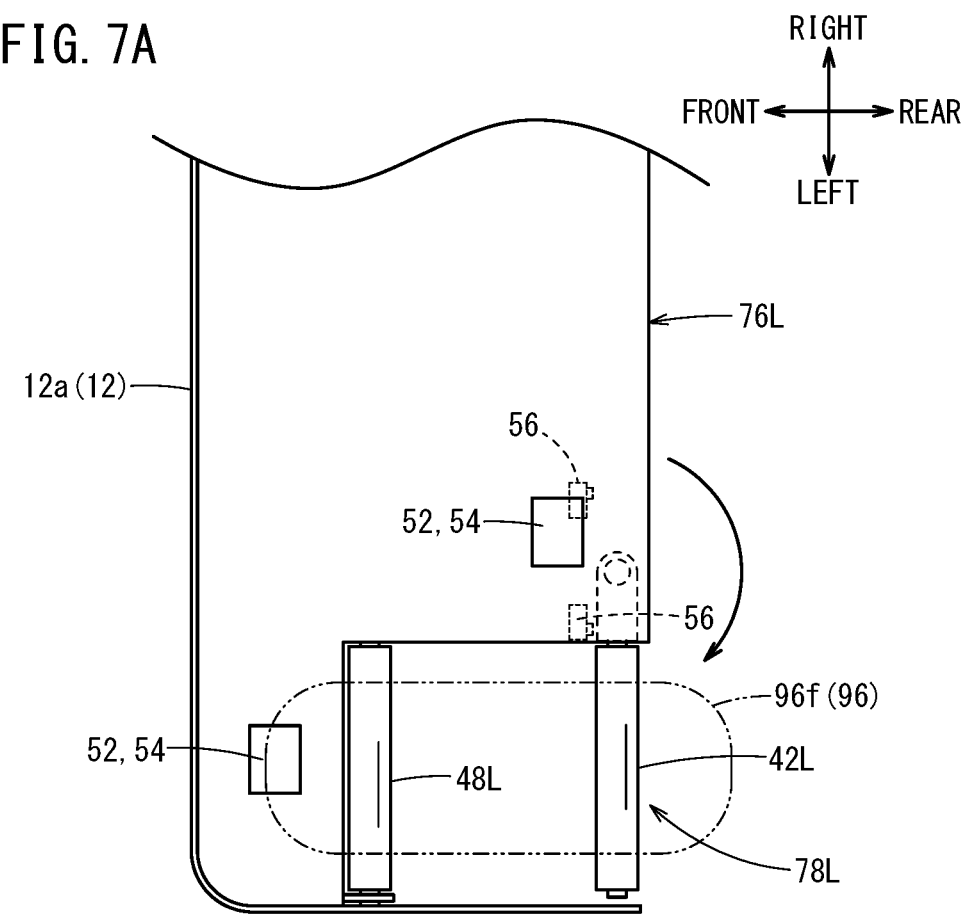
FIGS. 7A and 7B are each a schematic view of the vehicle transport apparatus after lifting up the wheels.
Figure 7B:
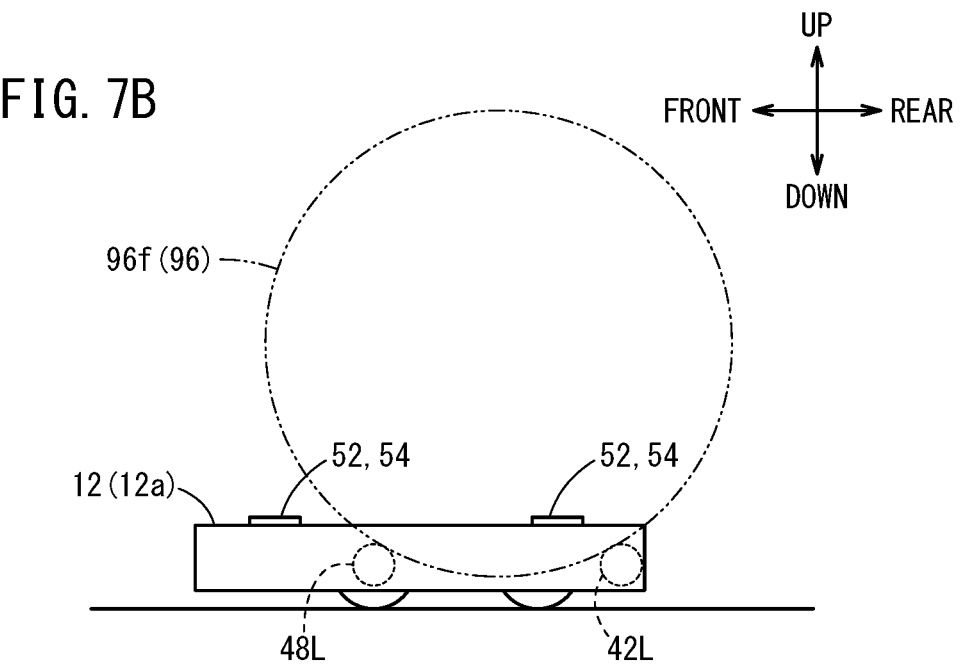

As shown in FIGS. 7A and 7B, the robot computing section 64 outputs a control signal to the motor driver 70 to cause the left and right loading motors 34 to operate. Since the operation of the right load-bearing mechanism 30R and the operation of the left load-bearing mechanism 30L are substantially the same, the following describes only the operation of the left load-bearing mechanism 30L. When the loading motor 34 of the left rotational force transmitting mechanism 32L operates, the left lifting arm 42L rotationally moves from the left storage position 76L to the left expanded position 78L and contacts the contact surface on the rear side of the front wheel 96f. When the loading motor 34 continues to operate, the left lifting arm 42L draws near the left contact portion 48L while the cylindrical member rotates. When this happens, the front wheel 96f on the left side is lifted up. When the loading motor 34 continues to operate, the left lifting arm 42L contacts the limit switch 56 at the position where the left lifting arm 42L has been rotated by 180 degrees, or 180 degrees plus or minus a few degrees, from the storage position. The robot computing section 64 detects the signal output from the limit switch 56, and outputs a control signal to the motor driver 70 to stop the loading motor 34. At the same time, the robot computing section 64 outputs a control signal to the power relay 72 to cause the brake 36 to operate.

When the first robot 12a is to lower the front wheels 96f, the robot computing section 64 causes the loading motor 34 to operate, thereby moving the left lifting arm 42L away from the left contact portion 48L. When this happens, the front wheel 96f on the left side is lowered to the ground. When the loading motor 34 continues to operate, the left lifting arm 42L moves rotationally from the left expanded position 78L to the left storage position 76L. The left lifting arm 42L at the left storage position 76L contacts the limit switch 56. The robot computing section 64 detects the signal output from the limit switch 56, and outputs a control signal to the motor driver 70 to stop the loading motor 34.

The above is a description of the loading operation of the first robot 12a. The loading operation of the second robot 12b is the same. However, as shown in FIGS. 1A and 1B, in the present embodiment, the front, rear, left, and right directions of the first robot 12a match the front, rear, left, and right directions of the vehicle 94, but the front, rear, left, and right directions of the second robot 12b are the opposite of the front, rear, left, and right directions of the vehicle 94. Therefore, for the loading operation of the second robot 12b, the front, rear, left, and right directions are the opposite of the front, rear, left, and right directions in the loading operation of the first robot 12a described above.

It should be noted that the front and rear directions of the first robot 12a and the second robot 12b relative to the vehicle 94 are not particularly limited. The front and rear directions of the first robot 12a may match the front and rear directions of the vehicle 94, or may be the opposite of these direction. Similarly, the front and rear directions of the second robot 12b may match the front and rear directions of the vehicle 94, or may be the opposite of these direction.

The robot computing section 64 of the first robot 12a and the robot computing section 64 of the second robot 12b can perform the loading operation of the first robot 12a and the loading operation of the second robot 12b at the same timing, or at different timings. For example, the robot computing section 64 of the first robot 12a may transmit a loading completion signal with the communicating section 62, after the loading operation is completed. In this case, the robot computing section 64 of the second robot 12b starts the loading operation (lifting and lowering the rear wheels 96r) upon receiving the loading completion signal with the communicating section 62. Alternatively, the loading operation of the first robot 12a may start after the loading operation of the second robot 12b has been completed. Furthermore, the robot computing section 64 may detect information indicating the weight distribution of the vehicle 94 and then determine the timing of the loading operation of the first robot 12a and the timing of the loading operation of the second robot 12b based on this detection result. The information indicating the weight distribution of the vehicle 94 may be transmitted from the vehicle 94, or may be transmitted from an external apparatus other than the vehicle 94.

[1.4. Travel Operation of the Transport Robots 12]

The robot computing section 64 of the first robot 12a causes the first robot 12a to travel along a travel route generated in advance, regardless of whether the vehicle 94 to be transported is present. The information of the travel route may be generated by the robot computing section 64 of the first robot 12a, or may be generated by the external server 102 (see FIG. 8). The information of the travel route is generated by arranging positions through which the first robot 12a is to travel (positions in the region), in order of time. The robot computing section 64 of the first robot 12a performs travel control by comparing the generated travel route to the position detected by at least one of the sensor group 50 and an external camera. It should be noted that, while the first robot 12a is travelling, the robot computing section 64 of the first robot 12a adjusts the travel route such that the distance between the first robot 12a and an obstacle is greater than or equal to a prescribed value, based on the image information captured by the camera 52 and the information detected by the distance sensor 54.

The robot computing section 64 of the first robot 12a may cause the first robot 12a to travel with a travel posture that is generated in advance. The first robot 12a can freely adjust its travel posture by individually adjusting the drive amounts and drive directions of the omnidirectional wheels 28. The information of the travel posture may be generated by the robot computing section 64 of the first robot 12a, or may be generated by the external server 102 (FIG. 8). The robot computing section 64 of the first robot 12a performs posture control by comparing the generated travel posture to the posture detected by the positioning section 60. It should be noted that, while the first robot 12a is travelling, the robot computing section 64 of the first robot 12a adjusts the travel posture such that the distance between the first robot 12a and an obstacle is greater than or equal to a prescribed value, based on the image information captured by the camera 52 and the information detected by the distance sensor 54.

The robot computing section 64 of the second robot 12b causes the second robot 12b to travel along the trajectory (travel trajectory) on which the first robot 12a travelled. At this time, the robot computing section 64 of the second robot 12b may acquire the information of the travel trajectory from the first robot 12*a* via the communicating section 62, or may calculate the travel trajectory of the first robot 12*a* based on the image information captured by the camera 52. In the same manner as in the first robot 12*a*, the robot computing section 64 of the second robot 12*b* adjusts the travel route (or the travel trajectory) such that the distance between the second robot 12*b* and an obstacle is greater than or equal to a prescribed value, based on the image information captured by the camera 52 and the information detected by the distance sensor 54. Furthermore, the robot computing section 64 of the second robot 12*b* performs the travel control such that a certain space is maintained between the second robot 12*b* and the first robot 12*a*.

[2. Usage Example of the Vehicle Transport Apparatus 10]

The vehicle transport apparatus 10 can be used in a prescribed region where transport of a vehicle 94 is necessary, such as a parking lot 80, a charging pot, a cargo ship, or a harbor, for example. Here, a vehicle transport system 100 is described that uses the vehicle transport apparatus 10 at a parking lot 80.

[2.1. Parking Lot 80]

As shown in FIG. 8, the parking lot 80 includes an entry space 82, an exit space 84, a parking space 86, and a standby space 88.

The entry space 82 is the entrance to the parking lot 80, and is also a space where the vehicle transport apparatus 10 lifts up the vehicle 94. The exit space 84 is the exit from the parking lot 80, and is a space where the vehicle transport apparatus 10 lowers the vehicle 94. The parking space 86 is a space where the vehicle 94 parks when the user of the vehicle 94 wants to park. The parking space 86 can house a plurality of vehicles 94. The standby space 88 is a space where the vehicle transport apparatus 10 is in standby.

[2.2. Configuration of the Vehicle Transport System 100]

The vehicle transport system 100 constructed at the parking lot 80 includes one or more vehicle transport apparatuses 10, the server 102, and a monitoring camera 110.

The server 102 is a computer that includes a server computing section 104 and a server storage section 106. The server computing section 104 is formed by a processor including a CPU, an MPU, and the like. The server computing section 104 performs various functions by executing programs stored in the server storage section 106. The server storage section 106 is formed by a RAM, a ROM, and the like. The server storage section 106 stores various programs, various types of information used in the processes performed by the server computing section 104, map information of the inside of the parking lot 80, and a parking list 120 (see FIG. 9).

As shown in FIG. 9, position information 122 indicating the position of each vehicle 94 and identification information 124 of a user that is to receive a parking service are stored in the parking list 120 in association with each other. The identification information 124 is information for identifying a vehicle 94 at the parking lot 80. Here, information indicating the contact information of a terminal apparatus 140 possessed by the user of the vehicle 94, a number set arbitrarily by the user, and the like are used as the identification information 124.

Returning to FIG. 8, the description is continued. The server 102 transmits and receives information wirelessly with the transport robots 12, and manages the activity of the transport robots 12. Furthermore, the server 102 performs communication in a wired or wireless manner with the monitoring camera 110, and monitors whether a vehicle is entering the parking lot 80 and the parking state. Yet further, the server 102 performs communication with the terminal apparatus 140 possessed by the user of the vehicle 94, and provides various notifications to the user, using close-range wireless communication or a public network.

The terminal apparatus 140 possessed by the user is a smartphone, a tablet, or the like, for example. The terminal apparatus 140 has a function of being able to perform communication using a public network or a function of being able to perform close-range wireless communication, such as Bluetooth (Registered Trademark). Software for using the parking lot 80 is installed in advance in the terminal apparatus 140.

[2.3. Each Process Performed by the Vehicle Transport System 100]

The following describes each process (entry process and exit process) performed by the vehicle transport system 100.

[A. Entry Process of the Vehicle 94 Entering the Parking lot 80]

The following describes the flow of the entry process in which the vehicle 94 enters the parking lot 80, using FIG. 10. A user who wants to enter the parking lot 80 with their vehicle applies for vehicle entry using the terminal apparatus 140, after stopping the vehicle 94 in the entry space 82.

At step S1, the terminal apparatus 140 transmits an entry request to the server 102. At this time, the terminal apparatus 140 transmits the identification information 124 (see FIG. 9) along with the request.

At step S2, the server computing section 104 checks the image information captured by the monitoring camera 110 in response to the entry request, and detects the vehicle 94. At step S3, the server computing section 104 generates the shortest travel route from the standby space 88 to the entry space 82 and the shortest travel route from the entry space 82 to the parking space 86. The server computing section 104 understands and grasps the approximate parking position of each vehicle 94 in a parking space 86, based on the parking list 120. The server computing section 104 arranges the vehicles 94 as closely as possible in a D1 direction and a D2 direction of the parking space 86. Therefore, the server computing section 104 generates the travel route from the entry space 82 to the parking space 86 after setting an arrival position within the parking space 86 in the D1 direction and D2 direction within a range where another vehicle 94 is not parked. At this time, the server computing section 104 may generate an optimal travel posture. At step S4, the server computing section 104 transmits route information indicating the generated travel route and transport-in instructions to the first robot 12*a* of the transport robots 12. When transmitting the travel route information, the server computing section 104 may also transmit the travel posture information. In the following, at any time when the vehicle 94 is not being transported, the server computing section 104 may generate and transmit the travel posture information in the same manner.

At step S5, the first robot 12*a* and the second robot 12*b* travel along the travel route and transport the vehicle 94 in. Specifically, the robot computing section 64 of the first robot 12*a* refers to the travel route from the standby space 88 to the entry space 82 and performs travel control of the first robot 12*a* and the second robot 12*b* (see section [1.4] above). When the first robot 12*a* and the second robot 12*b* arrive at the entry space 82, each robot computing section 64 lifts up the vehicle 94 (see section [1.3] above). At this time, each robot computing section 64 calculates a protrusion amount in the front-rear direction and left-right direction (width direction) of the vehicle 94 relative to each robot, based on the image information captured by the camera 52 and the information detected by the distance sensor 54. When the loading operation is completed, the robot computing section 64 of the first robot 12a refers to the travel route from the entry space 82 to the parking space 86 and performs travel control of the first robot 12a and the second robot 12b (see section [1.4] above).

At step S6, when the first robot 12a and the second robot 12b arrive at the parking space 86, each robot computing section 64 adjusts the parking position of the vehicle 94. Here, the robot computing section 64 of the first robot 12a infers the distance in the horizontal direction between the vehicle 94 and an object (another vehicle 94, a wall, or the like) that is near the vehicle 94 loaded by the robots, based on the information detected by the distance sensor 54. For example, the robot computing section 64 of the first robot 12a calculates the distance between the object and the first robot 12a, subtracts the protrusion amount of the vehicle 94 from this calculation result, and sets this subtraction result as the distance between the object and the vehicle 94. The robot computing section 64 of the first robot 12a controls the drive mechanism 20, the right load-bearing mechanism 30R, and the left load-bearing mechanism 30L such that the vehicle 94 is lowered at a position where the distance between the object and the vehicle 94 is greater than zero and also less than a or equal to an upper limit value. The robot computing section 64 of the second robot 12b also performs the same type of control. After the parking position of the vehicle 94 has been adjusted, each robot computing section 64 lowers the vehicle 94 (see section [1.3] above). At step S7, the robot computing section 64 of the first robot 12a transmits the information of the parking position detected by the positioning section 60 along with a transport-in completion notification to the server 102.

At step S8, the server computing section 104 transmits a parking completion notification to the terminal apparatus 140 of the user.

At step S9, the server computing section 104 uses the information of the parking position of the vehicle 94 as the position information 122 and updates the parking list 120 by associating the identification information 124 transmitted from the terminal apparatus 140 at step S1 with this position information 122. At step S10, the server computing section 104 generates the shortest travel route from the parking space 86 to the standby space 88. At step S11, the server computing section 104 transmits the route information indicating the generated travel route and return instructions to the first robot 12a.

At step S12, the first robot 12a and the second robot 12b travel along the travel route. Specifically, the robot computing section 64 of the first robot 12a refers to the travel route from the parking space 86 to the standby space 88 and performs travel control of the first robot 12a and the second robot 12b (see section [1.4] above). At step S13, when the first robot 12a and the second robot 12b arrive at the standby space 88, the robot computing section 64 of the first robot 12a transmits a return notification to the server 102.

[B. Exit Process of the Vehicle 94 from the Parking Lot 80]

The following describes a flow of an exit process of the vehicle 94 from the parking lot 80, using FIG. 11. A user who wants to exit the parking lot 80 with their vehicle applies for exit using the terminal apparatus 140.

At step S21, the terminal apparatus 140 transmits an exit request to the server 102. At this time, the terminal apparatus 140 transmits the identification information 124 (see FIG. 9) as well.

At step S22, the server computing section 104 specifies the parking position of the vehicle 94 that is to exit. Here, the server computing section 104 refers to the parking list 120 and specifies the parking position corresponding to the identification information 124 transmitted from the terminal apparatus 140 at step S21. At step S23, the server computing section 104 generates the shortest travel route from the standby space 88 to the parking space 86 and the shortest travel route from the parking space 86 to the exit space 84. At step S24, the server computing section 104 transmits the route information indicating the generated travel routes and the transport-out instructions to the first robot 12a of the transport robots 12. The server computing section 104 references the parking list 120 and checks whether it is necessary to move another vehicle 94 parked in the parking space 86 in order to secure the space for the transport path. If it is necessary to move another vehicle 94, the server computing section 104 transmits transport instructions for temporarily moving the other vehicle 94 to another first robot 12a. This other first robot 12a temporarily moves the other vehicle 94.

At step S25, the first robot 12a and the second robot 12b travel along the travel route, to transport the vehicle 94. Specifically, the robot computing section 64 of the first robot 12a refers to the travel route from the standby space 88 to the parking space 86 and performs travel control of the first robot 12a and the second robot 12b (see section [1.4] above). When the first robot 12a and the second robot 12b arrive at the parking space 86, each robot computing section 64 lifts up the vehicle 94 (see section [1.3] above). When the loading operation is completed, the robot computing section 64 of the first robot 12a refers to the travel route from the parking space 86 to the exit space 84 and performs travel control of the first robot 12a and the second robot 12b (see section [1.4] above). When the first robot 12a and the second robot 12b reach the exit space 84, each robot computing section 64 lowers the vehicle 94 (see section [1.3] above). At step S26, the robot computing section 64 of the first robot 12a transmits a transport-out completion notification to the server 102.

At step S27, the server computing section 104 transmits an exit notification to the terminal apparatus 140 of the user.

The flow from step S28 to step S31 is the same as the flow from step S10 to step S13 shown in FIG. 10. However, here, the travel route from the exit space 84 to the standby space 88 is generated.

When the vehicle 94 has exited, the server computing section 104 preferably moves and rearranges the vehicles 94 parked in the parking space 86, as closely as possible in the D1 direction and the D2 direction. At this time, a process that is the same as in step S3 to step S6 is performed. The server computing section 104 then modifies the position information 122 of the vehicles 94 that have been moved and updates the parking list 120.

[3. Modifications and Other Additional Functions]

When the robot computing section 64 checks its own position and posture based on inertial navigation, it is preferable to adjust the position and posture of the robot computing section 64 checked at a prescribed timing or a certain timing. For example, the parking lot 80 (standby space 88 or the like) is provided with an indicator at a prescribed position, and this prescribed position is stored in each robot storage section 66. The robot computing section 64 adjusts its own position and posture checked at this point of time by using the prescribed position stored in the robot storage section 66 and a direction and distance of the indicator relative to the body 16 detected by the camera 52 and the distance sensor 54.

With the vehicle transport system 100 shown in FIG. 8, it is possible to provide maintenance information to the user of the vehicle 94 parked in the parking lot 80. For example, when the robot computing section 64 enters underneath the vehicle 94 or passes underneath the vehicle 94, an image of the bottom surface or the tires of the vehicle 94 is captured by the camera 52. Then, the robot computing section 64 associates the image information with the position information 122 and the identification information 124 of the vehicle 94. The robot computing section 64 analyzes the image information to detect scratches or the like on the bottom surface or to check the wear and damage of the tires. In a case where the left and right contact portions and lifting arms are provided with sheet-shaped pressure sensors, the robot computing section 64 judges whether the air pressure in the tires is insufficient, based on the detection results of the pressure sensors. The robot computing section 64 transmits these pieces of maintenance information to the terminal apparatus 140.

[4. Technical Concepts that can be Realized from the Embodiments]

The technical concepts that can be understood from the embodiments described above are described below.

An aspect of the present invention is a vehicle transport apparatus 10 configured to transport a vehicle 94 by lifting up wheels 96 of the vehicle 94, including:

a first robot 12a configured to enter underneath the vehicle 94, lift up front wheels 96f of the vehicle 94, and travel; and a second robot 12b configured to enter underneath the vehicle 94, lift up rear wheels 96r of the vehicle 94, and travel, wherein the first robot 12a and the second robot 12b each include:
omnidirectional wheels 28 configured to cause a body 16 to freely travel and turn omnidirectionally;
a drive force transmitting mechanism 22 configured to transmit a drive force to the omnidirectional wheels 28;
a distance sensor 54 configured to detect a distance between a corresponding robot (first robot 12a or second robot 12b) and an object near the corresponding robot (first robot 12a or second robot 12b); and
a robot computing section 64 configured to control a travel operation and a loading operation of the corresponding robot (first robot 12a or second robot 12b), wherein when the vehicle 94 is to be lowered in a parking region (parking space 86 of a parking lot 80), the robot computing section 64 adjusts a parking position of the vehicle 94 based on information detected by the distance sensor 54.

According to the above configuration, when the vehicle 94 is to be lowered in a parking space 86 of the parking lot 80, the robot computing section 64 adjusts the parking position of the vehicle 94 based on the information detected by the distance sensor 54. Therefore, the vehicles 94 can be parked as close to each other as possible in the parking space 86 of the parking lot 80, and more vehicles 94 can be parked. Accordingly, it is possible to effectively utilize the space of the parking lot 80.

In this aspect of the present invention,
the robot computing section 64 may infer a distance between the vehicle 94 and the object based on the information detected by the distance sensor 54, and control a travel operation and a loading operation of the corresponding robot (first robot 12a or second robot 12b) in a manner to lower the vehicle 94 at a position where the distance is greater than zero and less than or equal to an upper limit value.

According to the above configuration, the vehicle 94 and the object (another vehicle 94, a wall, or the like) can be brought close together without making contact.

In this aspect of the present invention,
the first robot 12a may be a master device, and
the second robot 12b may be a slave device.

According to the above configuration, the first robot 12a and the second robot 12b can easily perform cooperative operations. Furthermore, the computational load of the second robot 12b is reduced.

In this aspect of the present invention,
a total height of the first robot 12a and a total height of the second robot 12b may each be less than 150 mm.

According to the above configuration, the first robot 12a and the second robot 12b can enter underneath the vehicle 94 that is at a height of at least 150 mm from the ground.

The vehicle transport apparatus according to the present invention is not limited to the above described embodiments, and it is obvious that various configurations can be included in the technical scope of the invention.

What is claimed is:

1. A vehicle transport apparatus configured to transport a vehicle by lifting up wheels of the vehicle, said vehicle transport apparatus comprising:

a first robot configured to enter underneath the vehicle, lift up front wheels of the vehicle, and travel; and a second robot configured to enter underneath the vehicle, lift up rear wheels of the vehicle, and travel, wherein the first robot and the second robot each include:
a body;
omnidirectional wheels operatively attached to the body and configured to cause the body to freely travel and turn omnidirectionally;
a drive force transmitting mechanism operatively attached to the body and configured to transmit a drive force to the omnidirectional wheels;
a load-bearing mechanism operatively attached to the body and including lifting arms, contact portions and loading motors;
a distance sensor configured to detect a distance between a corresponding robot of the first and second robots and an object near the corresponding robot; and
a robot computing section configured to control a travel operation and a loading operation of the corresponding robot, wherein:
the contact portions are configured to contact ground-contact-surfaces of the front wheels of the vehicle when the first robot approaches the front wheels, and contact ground-contact-surfaces of the rear wheels of the vehicle when the second robot approaches the rear wheels,
the vehicle transport apparatus is configured such that:
when the loading motors operate, the lifting arms move from storage positions to expanded positions and contact the ground-contact-surfaces of the front wheels or the rear wheels, the contact portions and the lifting arms contacting different areas of the ground-contact-surfaces in a front-rear direction,
when the loading motors continue to operate, the lifting arms further move to approach the contact portions and lift up the front wheels or the rear wheels, and
when the vehicle is to be lowered in a parking region, the robot computing section adjusts a parking position of the vehicle based on information detected by the distance sensor.

2. The vehicle transport apparatus according to claim 1, wherein
the robot computing section is configured to calculate a distance between the vehicle and the object, based on the information detected by the distance sensor, and is configured to control a travel operation and a loading operation of the corresponding robot in a manner to lower the vehicle at a position where the distance is greater than zero and less than or equal to an upper limit value.

3. The vehicle transport apparatus according to claim 1, wherein the first robot is a master device, and the second robot is a slave device.

4. The vehicle transport apparatus according to claim 1, wherein a total height of the first robot and a total height of the second robot are each less than 150 mm.

5. The vehicle transport apparatus according to claim 1, wherein each of the lifting arms comprises a rotating rod including a first shaft member that is parallel to a width direction of the first robot or the second robot, and a cylindrical member that is concentric with the first shaft member and rotatable around the first shaft member.

6. The vehicle transport apparatus according to claim 5, wherein the contact portions each comprise a second shaft member extending in the width direction of the first robot or the second robot, and a cylindrical member that is concentric with the second shaft member and rotatable around the second shaft member.

7. The vehicle transport apparatus according to claim 1, wherein the apparatus is configured such that during operation thereof, the front wheels or the rear wheels of the vehicle are lifted up between the lifting arms and the contact portions.

8. The vehicle transport apparatus according to claim 1, wherein the distance sensor is provided in plural and disposed on an opposite side of the lifting arms with respect to axes of the contact portions.

\* \* \* \* \*